Patented Sept. 13, 1927.

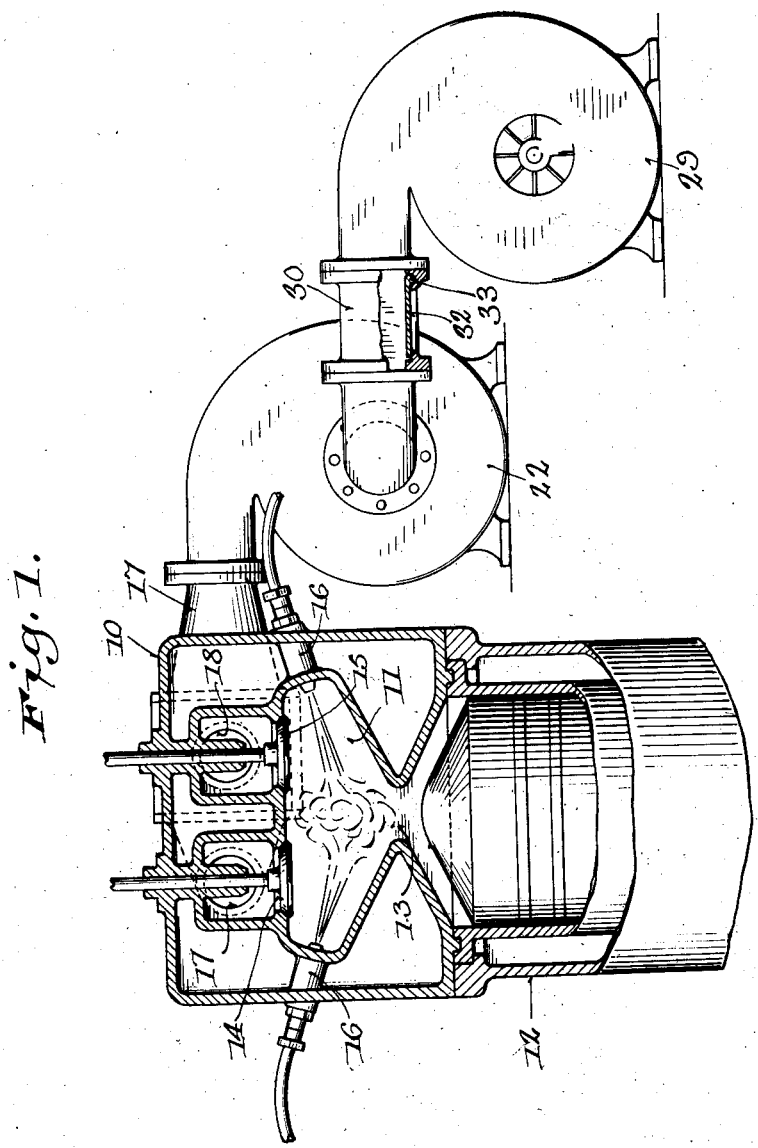

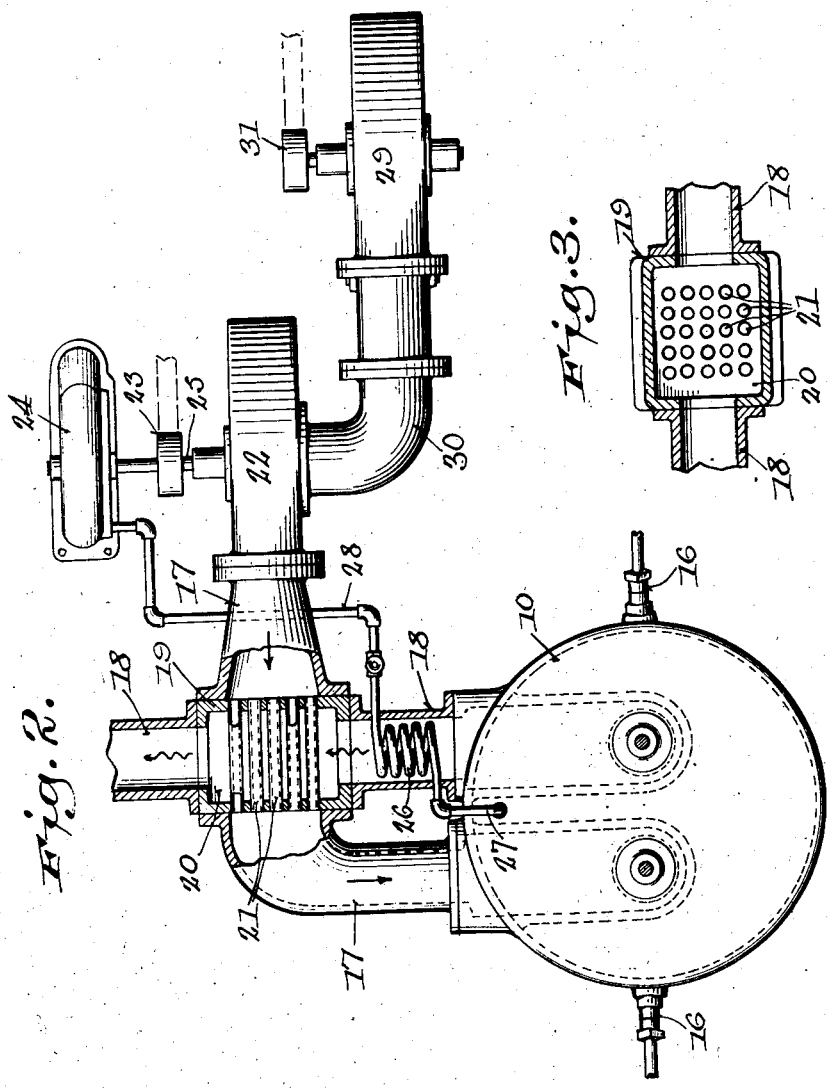

1,642,137

UNITED STATES PATENT OFFICE.

OTTO A. BANNER, OF MILWAUKEE, WISCONSIN, ASSIGNOR TO THE FALK CORPORATION, OF MILWAUKEE, WISCONSIN, A CORPORATION OF WISCONSIN.

OIL ENGINE.

Application filed March 30, 1921. Serial No. 456,933.

This invention relates to oil engines and has special reference to auto-ignition oil engines, although certain features thereof may be employed to advantage in oil engines of other types.

In standard types of oil engines, in which the ignition of the fuel charge is effected solely by the heat of compression, high compressions are ordinarily required for successful operation. For instance, the standard Diesel engines ordinarily operate under at least 500 pounds compression. Of course, the temperature of the fuel charge at final compression is dependent upon the temperature before compression. This consideration has led to the suggestion that the incoming air be heated before its admission to the compression space in order to provide the necessary compression temperature, without requiring such high compression pressures. This suggestion has not heretofore met with great success. This may, at least in part, be due to the fact that preheating of the air produces a rarefaction of the air, so that the quantity (by weight) of the air admitted to the compression space is reduced.

One object of the present invention is to devise a novel method of and means for treating the air, that goes to make up the combustible charge, in such manner that the engine may operate under compressions materially lower than those ordinarily required, thus materially increasing the general efficiency thereof.

Another object is the provision of a system of air treatment, by which the energy in the form of heat ordinarily discarded by the engine may be utilized in effecting the purposes above mentioned.

Another object is the provision of a device for use with an auto-ignition oil engine and capable of carrying out the purposes referred to.

Another object is the provision of a novel method and means by which the thermal energy ordinarily discarded by the engine may be utilized in increasing the initial pressure of the air charge.

Another object is to devise a novel method of treating the air, that goes to make up the combustible charge, so that a low compression engine may be easily started from the cold without requiring the use of a special igniting device, such as a torch, spark plug or resistance coil.

Another object is the provision of a novel air admission system for low compression oil engines for carrying out the method last mentioned.

Other objects and advantages will later appear.

One embodiment of the invention is illustrated in the accompanying drawings, in which:

Figure 1 is a vertical sectional view of an engine cylinder provided with an air treating device constructed in accordance with the present invention.

Figure 2 is a plan view of the mechanism shown in Figure 1.

Figure 3 is a detail sectional view taken substantially on the line 3—3 of Figure 2.

For convenience of illustration and explanation, the invention is shown and will be described as embodied in a reciprocating auto-ignition engine of the solid injection type, although it is equally applicable to other types of engines, such, for instance, as rotary engines or turbines.

The engine selected for illustration includes a cylinder head 10 having a combustion chamber 11 communicating with the working space in the cylinder 12 through a restricted opening 13. The admission of air is controlled by a valve 14 and the exhaust of the products of combustion is controlled by a valve 15. The fuel is forced under pressure through the opposed atomizing nozzles 16 near the end of the compression stroke, so that a cloud of fuel mist is formed within the chamber 11 and mixed with the air compressed therein. This is an old form of four cycle, solid injection oil engine, in which ignition of the combustible charge is effected by the heat of compression. It will serve, however, to illustrate a use to which the present invention may be applied.

As above pointed out, the present invention has to do with a novel method and means for treating the air that enters into the combustible charge. In ordinary practice, air is admitted to the engine at normal temperatures, so that comparatively high compression pressures are required to raise the temperature of the charge to the degree at which spontaneous combustion occurs. In order to successfully operate the engine at lower compression pressures, the present invention, among other things, provides for the admission of air at a higher temperature;

and in order to compensate for the rarefaction of the air due to its higher temperature, the admission pressure thereof is increased. Although the air may be heated in various ways before admission to the engine, the heat ordinarily discarded by the engine—such as the heat of the exhaust gases or of the cooling system—is preferably utilized for this purpose.

A system for carrying out these purposes is illustrated, more or less diagrammatically, in the drawings. In the system shown, the heat from the exhaust gases is transferred to the air charge. Air is admitted to the engine through a conduit 17 and the exhaust gases are carried away through a conduit 18. A heating chamber 19 is provided at the intersection of these conduits. This chamber may be constructed in various ways, but in the present instance, includes a compartment 20 in communication with the exhaust conduit 18, and a plurality of tubes 21 in communication with the conduit 17. The exhaust gases heat up the tubes 21 during their passage around and between them, and this heat is transmitted to the air as it passes through the tubes.

Any appropriate means may be employed for delivering the air charge under pressure to the engine. In this instance, a supercharger, herein typified by a centrifugal blower 22 of standard construction, is employed for this purpose. This blower is shown connected with the conduit 17 in such manner as to deliver air under pressure therethrough and through the tubes 21 to the engine cylinder. This blower may be driven from any appropriate source of power (not shown), through suitable connections, such as a belt and pulley 23, or it may be driven by means actuated by thermal energy ordinarily discarded by the engine.

A driving mechanism for this purpose is typified by a small steam turbine 24 of any standard or approved construction, diagrammatically indicated in Figure 2. This turbine is shown mechanically connected with the shaft 25 of the blower 22 and is actuated by steam generated by the heat of the exhaust gases. A steam boiler or generator is typified by a coil 26 arranged within the exhaust conduit 18. The coil 26 may be connected with any appropriate source of water supply through a pipe 27, but in order to utilize the heat in the engine cooling system this pipe is preferably connected with the water jacket surrounding the engine cylinder. During the operation of the engine, the coil 26 receives water in a heated condition. The hot exhaust gases, in their passage around and between the convolutions of this coil, convert the water therein into steam that is transmitted through a pipe 28 to the turbine 24. Thus it will be seen that the heat energy of the exhaust gases and the heat energy of the cooling system are utilized in increasing the admission pressure of the air charge, thus reducing the work ordinarily required of the piston in producing the final compression pressure. It will be further noted that when the mechanism is employed in combination with that hereinabove previously described, the heat energy ordinarily discarded by the engine may be utilized in increasing both the admission pressure and admission temperature of the air charge. In other words, at least a very large proportion of the energy that is ordinarily wasted in the form of heat is actually returned to the engine and put to practical use in preparing the air charge and thus materially increasing the general efficiency of the engine.

In actual practice, very large proportions of the total thermal energy developed by an internal combustion engine are ordinarily carried away by the exhaust gases and by the cooling system, the exhaust gases leaving the engine at rather high temperatures and the cooling water at somewhat lower temperatures. The boiler or coil 26 and heating chamber 19 are preferably so arranged that the exhaust gases in their exit will first contact with the boiler to generate the desired steam pressure and will then pass on at a somewhat lower temperature to the heating chamber 19 where their heat is transmitted to the air charge. When the water in the coil 26 is received from the cooling system the exhaust steam from the turbine 24 is preferably passed into a condenser (not shown) of standard construction and the water of condensation returned to the cooling system.

During the operation of the engine, the heat of the exhaust gases and the pressure generated by the blower 22 are sufficient to increase the temperature and pressure of the air to such degrees that a comparatively low compression is required to effect spontaneous combustion of the combustible charge. Before starting, however, the engine and the heating chamber 19 are cold, so that the air is admitted at normal temperature and a portion of the heat of compression is lost to the cylinder walls, etc. Under these conditions, the normal compression pressures are not sufficient to produce the required ignition temperatures.

To overcome this difficulty, the air, when starting from the cold, is admitted under a still higher pressure. In this way, the final compression pressure is sufficiently increased to provide the required ignition temperatures. For this purpose, any appropriate means, such as a second blower 29, is provided. This blower is connected in series with the blower 22 through a conduit 30 and is driven by any suitable means, such as a belt and pulley 31. In starting from the cold, both blowers 22 and 29 are preferably driven from any appropriate source of power (not shown).

Thus the blower 22 receives air from the blower 29 at a pressure considerably above atmospheric pressure, and acts upon this air to force it into the engine at a still greater pressure. This increase in admission pressure of the air charge is sufficient to so increase the final compression pressure as to obtain the necessary ignition temperature. After the engine has been well started and warmed up, the blower 29 may be brought to rest.

To avoid drawing the air through the blower 29 when this blower is out of use, a one way valve, such, for instance, as shown at 32, may be provided in the wall of the conduit. This valve is hingedly supported, as at 33, in such manner as to open inwardly. So long as the blower 29 is operating, the valve remains closed under the air pressure in conduit 30, but when the blower 23 is brought to rest, this valve is opened under the suction of the blower 22.

Various changes may be made in the embodiment of the invention above described, without departing from or sacrificing any of the advantages of the invention as defined in the following claim.

I claim:

In an oil engine the combination of a cylinder, a piston working therein, and a series of blowers selectively operable to deliver air to said cylinder under varying pressures.

In witness whereof, I hereunto subscribe my name this 25th day of March, 1921.

OTTO A. BANNER.